United States Patent [19]
Yamauchi

[11] Patent Number: 5,836,691
[45] Date of Patent: Nov. 17, 1998

[54] METHOD OF THERMOMETRY AND APPARATUS FOR THE THERMOMETRY

[75] Inventor: Tsuneo Yamauchi, Nagoya, Japan

[73] Assignee: Techno Togo Limited Company, Mino, Japan

[21] Appl. No.: 683,614

[22] Filed: Jul. 17, 1996

[51] Int. Cl.$^6$ ............................................. G01K 11/26
[52] U.S. Cl. ......................................................... 374/117
[58] Field of Search .................................. 374/100, 117, 374/163, 170; 310/315, 316, 360

[56] References Cited

U.S. PATENT DOCUMENTS

| | | | |
|---|---|---|---|
| 3,355,949 | 12/1967 | Elwood et al. | 374/117 |
| 3,553,602 | 1/1971 | Brothers et al. | 374/117 |
| 4,398,115 | 8/1983 | Gagnepain et al. | 374/117 |
| 4,437,773 | 3/1984 | Dinger et al. | 374/117 |
| 4,551,031 | 11/1985 | Ishikawa et al. | 374/117 |
| 4,558,248 | 12/1985 | Valentin | 374/117 |
| 4,644,481 | 2/1987 | Wada | 374/100 |
| 4,728,199 | 3/1988 | Murai et al. | 374/170 |
| 5,214,668 | 5/1993 | Satou et al. | 374/117 |

FOREIGN PATENT DOCUMENTS 61-193038  8/1986  Japan .................................. 374/117

*Primary Examiner*—G. Bradley Bennett

[57] ABSTRACT

A detector unit of a thermometer of this invention is comprised of a pair of oscillators which are closely installed each other. We make a latch signal of a counter circuit for specially made crystal resonator whose number of proper vibration changes with temperature, and latch a counter value of a counter circuit for reference crystal resonator by said latch signal. We calculate the temperature by a microcomputer using the latched value from the said reference crystal resonator. The power consumption of an electric circuit of the detector unit is less than 0.6 mW under the condition of the supply voltage at DC 2.5V.

2 Claims, 5 Drawing Sheets

METHOD OF THERMOMETRY AND APPARATUS FOR THE THERMOMETRY

BACKGROUND OF THE INVENTION

The present invention relates to a method for thermometry using an oscillator whose number of proper vibrations changes according to temperature and describes the apparatus for the thermometry.

One of the methods of thermometry in public use using a crystal resonator was a period counter method which determined the period of a certain number of pulses which came from the resonator as a detector. The period was decided from counted value of a known frequency of reference crystal resonator, which then had to kept constant. In order to maintain the frequency stability of the reference resonator, a stable oven controlled crystal oscillator unit or a stable TCXO (temperature compensated crystal oscillator) unit has been used. The power consumption of both units was too high for operation with dry batteries. The method was also plagued by the instability of the triggering point, because the edge of the input pulses from the oscillator was not ideally sharp in the case of sending pulses to a recorder placed at a distance.

Another popular method was a beat frequency method. The beat frequency was obtained from the numerical difference between the unknown frequency from the resonator as the detector and a known reference frequency. The beat frequency varies according to the change in measured temperature on condition that the reference frequency is kept constant. Temperature was calculated from a value which was obtained after demodulating the beat frequency. A very high stability of reference frequency was also required for this method to accurately obtain the temperature.

SUMMARY OF THE INVENTION

The present invention was made to improve drawbacks of the previously described thermometers. Information about temperature is obtained from frequency variations due to temperature change, not only from an oscillator whose number of proper vibrations changes with temperature, but also from a reference oscillator.

The preferred model of the invention, utilizes a pair of crystal resonators in close proximity as the detector unit, which enables highly accurate temperature measurements. One of the crystal resonator is especially made to have a temperature coefficient of the frequency variation which is larger than that of the other resonator, whose temperature coefficient of the frequency variation is small and serves as a reference. The frequencies of both crystal resonators are measured with counters. Firstly, a certain time interval is set by the counter circuit for the specially made crystal resonator. Secondly, a counted value of the counter circuit is latched for the reference crystal resonator, using the interval signal as the latch signal. The temperature from the counted value is then calculated in the recording unit. The stability of reference resonator is not required for the new thermometer presented here nor are the oven controlled oscillator unit or TCXO unit. The power consumption of this new method is low enough to operate the apparatus with dry batteries. Moreover, digital temperature data can be obtained at the detector unit, and can be easily sent to a recorder placed at a distance.

DETAILED DESCRIPTION OF THE INVENTION

Figure 1:
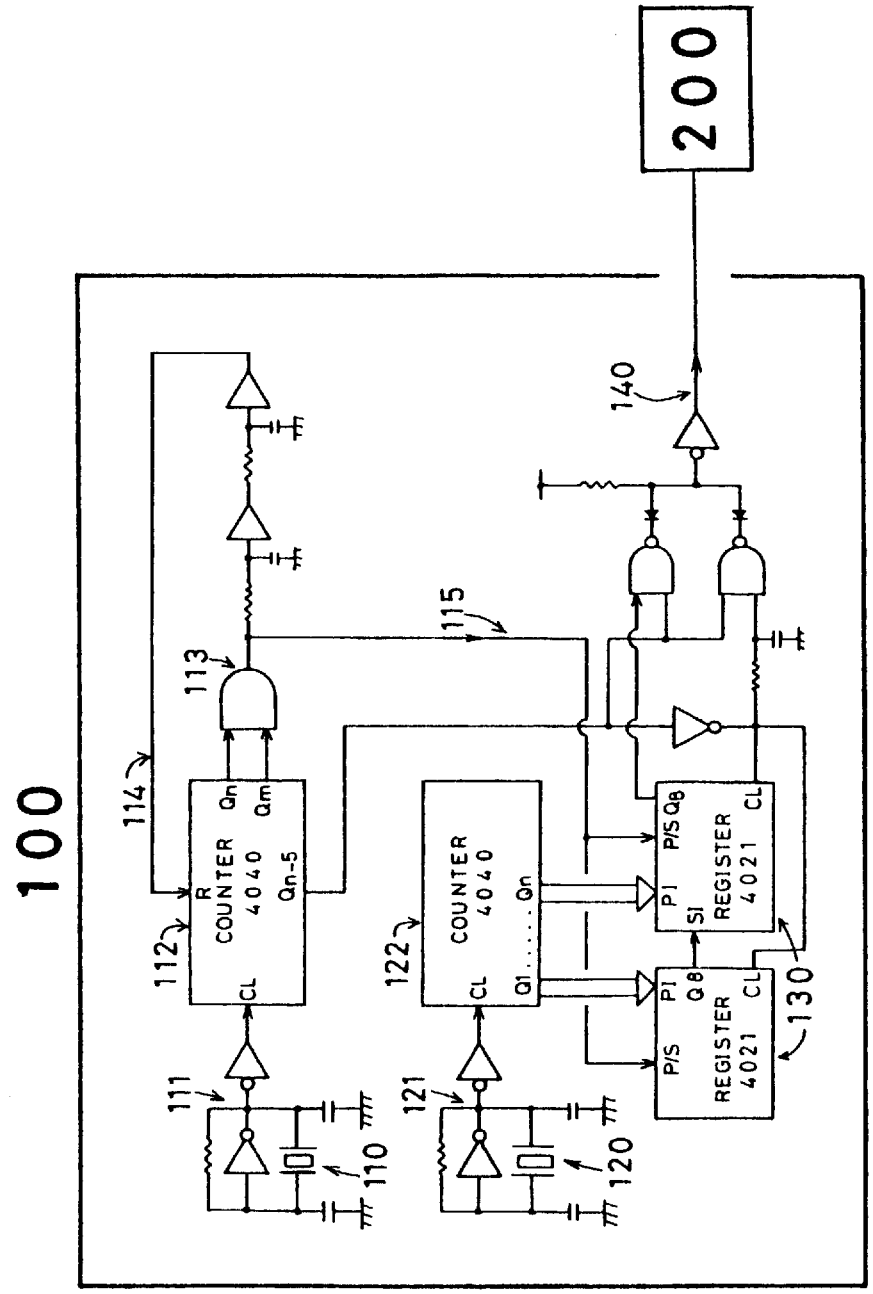
FIG. 1 shows a block diagram of a typical detector unit of the thermometer. The electric circuit comprises crystal resonators, oscillator circuits, counters, gates, and registers.

An electric circuit of the detector unit 100 of the preferred embodiment is simple. The block diagram in FIG. 1 explains the circuit in greater detail. Two crystal resonators 110 and 120 are made to oscillate with oscillator circuits 111 and 121, and the frequencies are measured by the counters 112 and 122. A certain time interval signal 114 is output by the gate circuit 113 using bit signals from the counter for the specially made crystal resonator 110 and resets the counter circuit. Using the interval signal 114 as a latch signal 115, the counted value from the counter for the reference crystal resonator 120 is latched. Since the frequency of the specially made crystal resonator varies according to the change in measured temperature, the interval time of the signal also changes. Therefore, the latched value from the counter 122 (for reference crystal resonator) varies with measured temperature. The latched value is sent as an output signal 140 to the recorder unit 200 shown in FIG. 2 through a parallel-in serial-out shift register 130 as digital data. The frequency of the reference crystal resonator also varies according to the change in measured temperature, so that the latched value is also affected by frequency variations of the reference crystal resonator due to temperature change.

The following Equations (1), (2), and (3) will explain futher. A time interval 114 at temperature t by the resonator 110 is assumed to be T, and a frequency of the reference resonator 120 in close proximity to resonator 110 is assumed to be f at temperature t. It is assumed that the time interval varies as $T+\Delta T$ and the frequency varies as $f+\Delta f$, corresponding to the temperature change from t to $t+\Delta t$.

A counted value at temperature t is written as $$T \cdot f, \qquad (1)$$

and a counted value at temperature $t+\Delta t$ is written as $$(T+\Delta T) \cdot (f+\Delta f), \qquad (2)$$

where $T \gg \Delta T$ and $f \gg \Delta f$ are assumed. A difference of counted value between the value at temperature $t+\Delta t$ and the value at temperature t is obtained as $$(T+\Delta T) \cdot (f+\Delta f) - T \cdot f = \Delta T \cdot f + T \cdot \Delta f, \qquad (3)$$

where a value $\Delta f \cdot \Delta T$ is remarkably smaller than the values $T \cdot \Delta f$ and/or $\Delta T \cdot f$, then the value $\Delta f \cdot \Delta T$ is considered 0 in Eq.(3). A pair of crystal resonators is used as a detector unit.

Resonators are in close proximity, therefore both values T·Δf and ΔT·f with temperature change in a constant proportion. The counted value obtained at every interval time bears information about temperature change according to Eq.(3). Once a relation between temperature t and the difference of a series of counted values is determined, the temperature from the difference can easily be calculated.

One concrete example of a detector unit is given here. An HTS-206 made by SEIKO-EPSON Co.,Ltd. (Japan) was selected as a specially made crystal resonator and a SPG-8640N crystal oscillator made by SEIKO-EPSON Co.,Ltd. was selected as a reference oscillator. The temperature coefficient of the frequency variation of the former crystal resonator was −29.6 ppm and the number of proper vibrations 40 KHz at 25° C. The temperature coefficient of the frequency variation of the latter oscillator was less than −0.035 ppm at 25° C. and the number of proper vibrations 600 KHz at 25° C. If the signal from the specially made crystal resonator is divided by 2 to the power of 22, an interval time of 104.9 sec can be obtained according to the following calculations,
where, 2 to the power of 22 is 4,194,304, and $$40000/4194304=0.0091536743,$$

then the interval time in seconds is $$1/0.0091536743=104.8576$$

If temperature around the detector unit varies from 25° C. to 26° C., the new interval time in seconds becomes $$104.8576 \cdot (1+29.6 \text{ ppm })=104.8576+3104 \text{ ppm},$$

and the difference of the interval time between 25° C. and 26° C. is 3104 ppm. The latched value from the counter for the reference oscillator also varies according to the variation of the interval time. In this case, the difference of the latched value is $$3104 \text{ ppm} \cdot 600000=3104 \cdot 0.6=1862.3,$$

and, 1862.3 counts can be measured per 1° C. As a result of this calculation, the temperature is determined with an accuracy greater than 0.001° C. In this case, the frequency variation for the reference oscillator is $$600000 \cdot 0.035 \text{ ppm}=0.6-0.035=0.021,$$

and, the value being less than 1, the effect of the frequency variation of the reference oscillator can be disregarded. If the latter value exceeds 1, the latched value must be corrected.

A series of counted values at every interval time (104.8576 sec) changes according to the temperature. If the counted values are compared for a period of 629.1 sec, then the average temperature for the 629.1 successive seconds can be counted with an accuracy greater than 0.0001° C. The accuracy of the temperature measurement of presented invention increases as the time of comparison of the counted values becomes longer. This is a special property of this invention. On the other hand, the accuracy of the temperature measurement using those methods of thermometry currently in the public use depends on the frequency stability of the reference crystal oscillator. The accuracy does not improve when the period of the measuring time of the temperature becomes longer.

Figure 2:
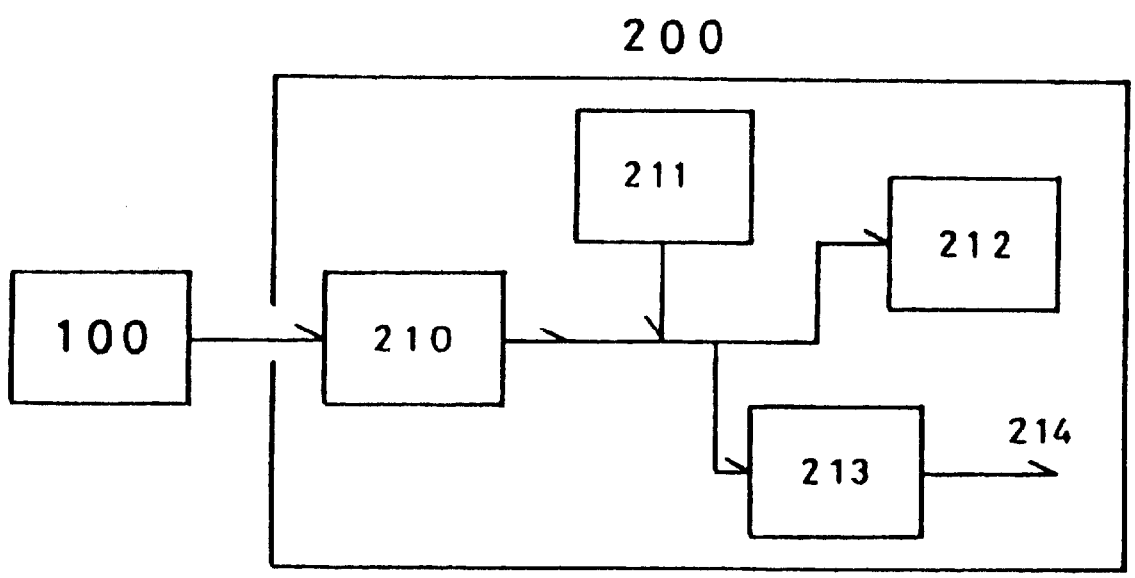
FIG. 2 shows a block diagram of a typical recorder unit of the thermometer. The electric circuit comprises a microcomputer, a ROM, a SRAM, and a D/A converter.

FIG. 2 shows a block diagram of a preferred embodiment of the recording unit 200. The output signal 140 which is sent from the detector unit 100 is read by a microcomputer 210, and the temperature is calculated by the microcomputer using a ROM 211. The calculated temperature is stored in a SRAM 212 or is converted to an analog signal 214 with a D/A converter 213.

Figure 3:
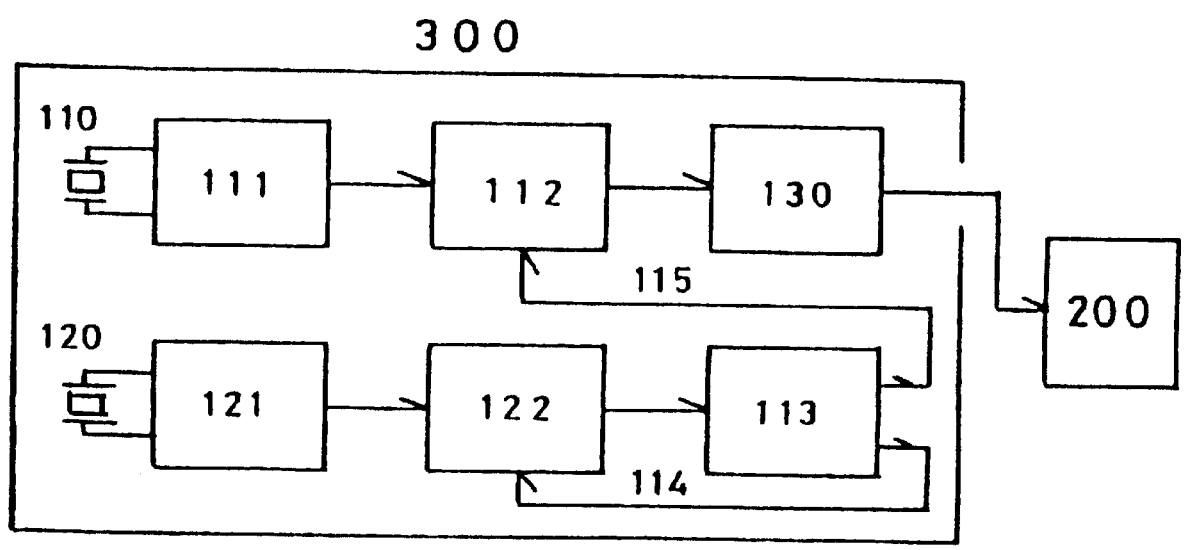
FIG. 3 shows a block diagram of another typical detector unit of the thermometer. The electric circuit also comprises crystal resonators, oscillator circuits, counters, gates, and registers.

In FIG. 1, the temperature with the counted value which is obtained by the electric circuit of the reference crystal resonator is calculated, however, the temperature with the counted value which is obtained by the electric circuit of the specially made crystal resonator can also be calculated as shown in FIG. 3. In this case, the time interval signal 114 and the latch signal 115 are produced with the gate circuit 113 of the counter 122 for the reference crystal resonator, and the counted value of the counter 112 is latched for the specially made crystal resonator, and the value is sent to the recording unit 200 through the register 130.

Figure 4:
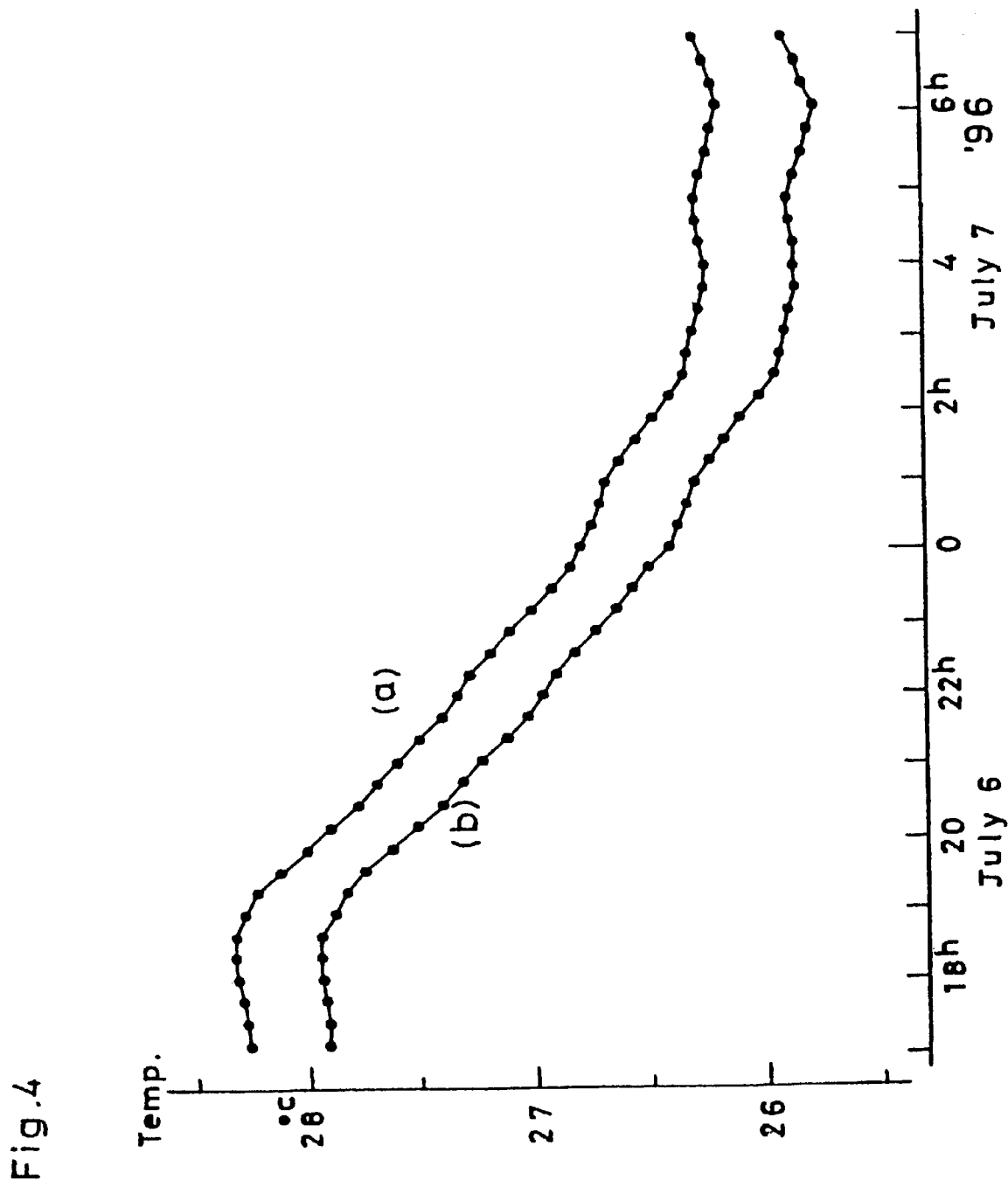
FIG. 4 shows an example of comparison of the temperature records. Curve (a) is the temperature record from the crystal thermometer DMT-600 made by Tokyo Denpakiki Co.,Ltd.(Japan), and curve (b) is the temperature record of presented invention. Curve (b) is plotted with shifted value corresponding to 0.4° C.
Figure 5:
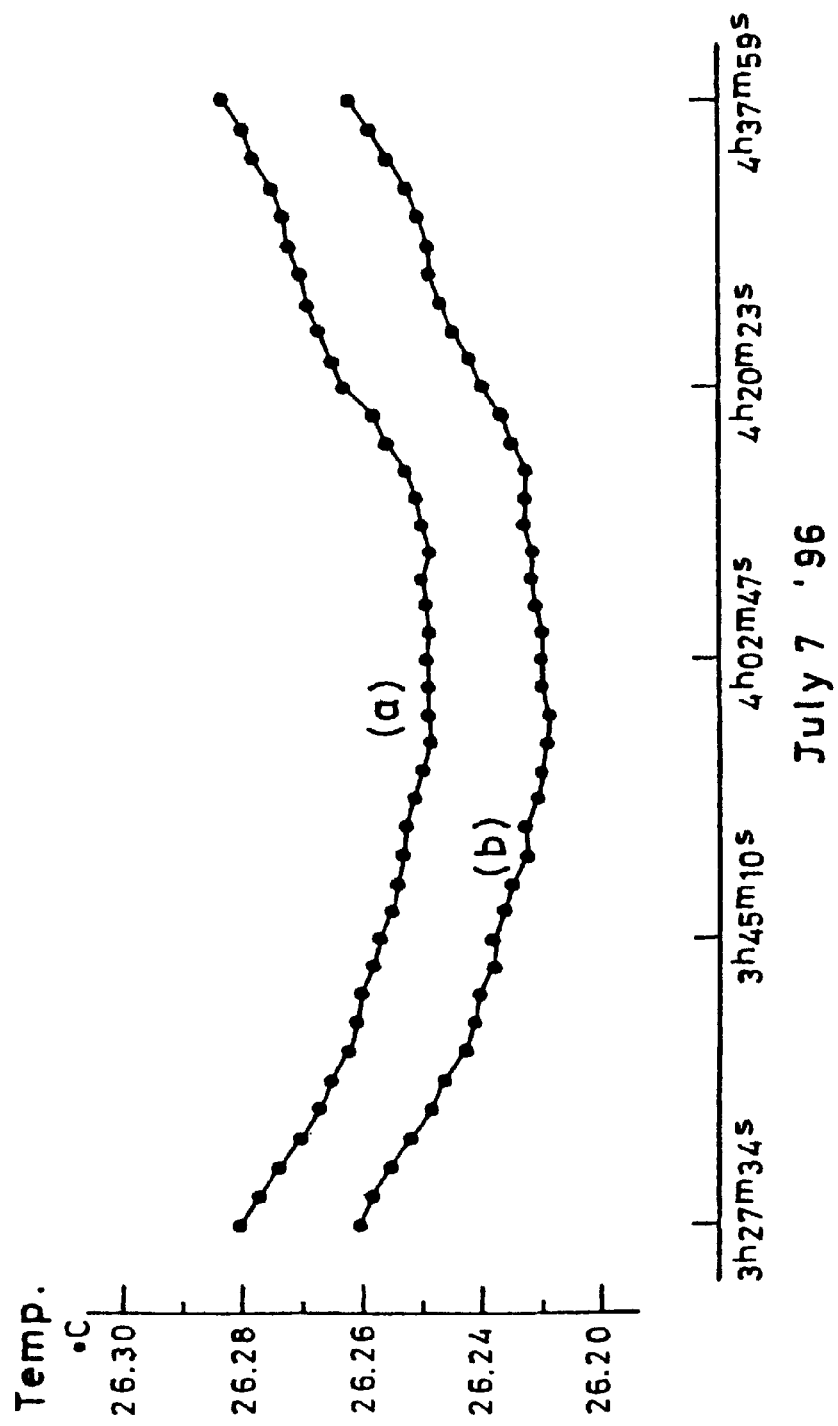
FIG. 5 shows an example of precise comparison of the temperature records. Notations are the same as in FIG. 4. Curve (b) is plotted with shifted value corresponding to 0.02° C.

FIG. 4 shows an example of comparison of the temperature records during the period from 17:18, Jul. 6, 1996 to 07:00, Jul. 7, 1966. Curve (a) is the temperature record from the crystal thermometer DMT-600 made by Tokyo Denpa-kiki Co.,Ltd. (Japan), and curve (b) is the temperature record of this hereby presented invention. Curve (b) is plotted with the shifted value corresponding to 0.4° C. FIG. 5 shows an example of precise comparison of the temperature records during the period from 3:27 to 4:37, Jul. 7, 1996. Notations are the same in FIG. 4. Curve (b) is plotted with a shifted value corresponding to 0.02° C. It is clear that the records of the measured temperature almost coincide with each other. The maximum difference of the records is 0.004° C. The power supply of the detector unit of the former thermometer is DC 3.28V, and consumes about 30 mW, but the latter one consumes about 1.0 mW at DC 3.28 V. The power consumption of the detector unit of this invention is lower than that of thermometer DMT-600. If the detector unit of this invention is used under conditions of a supply voltage of DC 2.50V, the unit consumes only 0.6 mW. Still more, the electric circuit of the units of this invention are simple, and the integrated circuits can be easily made, which decrease the size of the unit. A detector unit of such small size is convenient for making a machine and/or device incorporating the detector unit for measuring the temperature in and around it.

As already mentioned, digital temperature data at the detector unit is obtainable at almost regular intervals and the data is sent to a recorder unit. If the electric power source of the recorder unit is kept on being cut off and power on it at regular intervals simultaneously with sending time of the data from the detector unit, power comsumption of the recorder can be reduced.

Thermometry utilizing crystal resonators has been discussed, but the temperature by this method can be measured using miscellaneous oscillators. The thermometer can be made at low cost using cheap oscillators, but the accuracy is not satisfactory.

Although the invention has been described in detail, various changes and modifications may be made within the limits of the invention as set forth in the following claims.

What is claimed is:

1. An electric thermometer comprising in combination: a first crystal resonator having a large temperature coefficient; a first oscillator circuit for producing an oscillating output signal; a first counter connected to receive the first oscillating signal from the first oscillator circuit; a gate connected to receive the counter stage contents from the first counter for producing a reset signal of the first counter stage contents; a second crystal resonator as a standard resonator having a small temperature coefficient; a second oscillator circuit for producing a reference oscillating output signal; a second counter connected to receive the second oscillating signal from the second oscillator circuit; a parallel-in serial-out shift register connected to the second counter for storing the counter stage contents and also connected to the gate for receiving a latch signal; and a recording unit means for receiving the counter stage contents from the parallel-in serial-out shift register placed at a far distance, comprising in combination: a microcomputer for receiving serial digital data from the register and for converting the received counter stage contents to temperature; a ROM to store a function table of a relationship between the counter stage contents and temperature; a SRAM for storing the converted temperature; and a D/A converter for making an analog signal in response to the temperature.

2. An electric thermometer according to claim 1, wherein the reset signal and the latch signal are produced by the second counter contents, and wherein the parallel-in serial-out shift register is connected to the first counter.

* * * * *